United States Patent
Jain

(10) Patent No.: US 9,779,091 B2
(45) Date of Patent: Oct. 3, 2017

(54) RESTORATION OF MODIFIED DOCUMENT TO ORIGINAL STATE

(71) Applicant: Adobe Systems Incorporated, San Jose, CA (US)

(72) Inventor: Ajay Jain, Uttar Pradesh (IN)

(73) Assignee: ADOBE SYSTEMS CORPORATION, San Jose, CA (US)

( * ) Notice: Subject to any disclaimer, the term of this patent is extended or adjusted under 35 U.S.C. 154(b) by 338 days.

(21) Appl. No.: 14/529,620

(22) Filed: Oct. 31, 2014

(65) Prior Publication Data

US 2016/0124813 A1 May 5, 2016

(51) Int. Cl.
*G06F 17/30* (2006.01)
*G06F 17/24* (2006.01)

(52) U.S. Cl.
CPC ...... *G06F 17/30011* (2013.01); *G06F 17/241* (2013.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 2004/0181746 A1* | 9/2004 | McLure | G06F 17/2247 715/233 |
| 2007/0250497 A1* | 10/2007 | Mansfield | G06F 17/30731 |
| 2013/0205202 A1* | 8/2013 | Xiao | G06F 17/2264 715/249 |
| 2013/0262983 A1* | 10/2013 | Richter | G06F 17/2247 715/234 |

OTHER PUBLICATIONS

"Optical Character Recognition," Wikipedia, the free encyclopedia. URL: http://en/wikipedia.org/wiki/Op . . . Downloaded from the Internet Oct. 30, 2014. 9 pages.

* cited by examiner

*Primary Examiner* — Shyue Jiunn Hwa
(74) *Attorney, Agent, or Firm* — Finch & Maloney PLLC

(57) ABSTRACT

Techniques are disclosed for restoring a modified document to an original state. The modified document is scanned into a digital form using an optical scanning device. The content of the modified digital document including one or more annotations is then grouped into several components, including text, images, form fields and text boxes, and marked shapes, based on corresponding component specifications. Each component is then categorized as being structured or unstructured. Structured components that correspond with representative entries in a component repository, such as text in a standard font size, weight and style, are identified as core document content. Unstructured components are identified as annotated document content or highlighted document content, depending on certain characteristics of the components. The categorized and identified components can then be presented separately or in various combinations.

17 Claims, 6 Drawing Sheets

RESTORATION OF MODIFIED DOCUMENT TO ORIGINAL STATE

FIELD OF THE DISCLOSURE

This disclosure relates to the field of data processing, and more particularly, to techniques for restoring a modified document to an original, unaltered state.

BACKGROUND

People often make handwritten notations and marks on the printed pages of a document or book. With the advent of digital publishing, such handwritten notes or other notations can also be made electronically on a given digital document. For example, the user of the document may write comments in the margins, draw symbols and illustrations in the whitespace, or underline or highlight portions of the text with a pencil, pen or colored marker. Such documents are called consumed documents since they have been altered by the people using them. One existing solution for restoring a physical marked-up copy of the document to an original state is to manually erase or mask the handwritten notations using correction fluid. However, this technique is manually intensive, and in some cases it may not be possible to mask all of the notations, such as where original text or graphics are highlighted in a contrasting color. Therefore, there is a need for improved techniques for restoring a consumed document to an original state.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
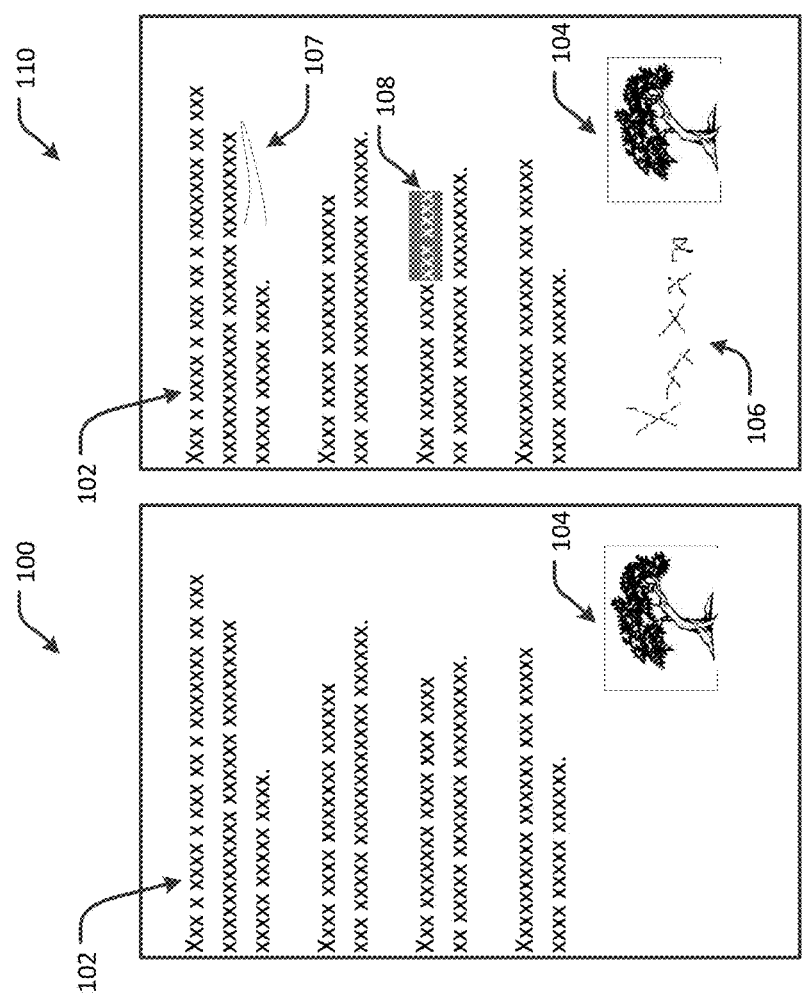
FIG. 1A shows an example representation of an original document, in accordance with an embodiment of the present invention.
FIG. 1B shows an example representation of a consumed document, in accordance with an embodiment of the present invention.

When a printed document is modified in any manner, such as by pencil or pen markings, those modifications are generally permanent or difficult to remove. It is also possible to modify the document using other devices, such as a typewriter, ink stamp or embossing dies. When the consumed document is scanned into electronic form so as to provide a digital version of the document, the modifications are included in the digital version. As a result, the digital version does not have the originality of the document as it existed before the modifications were made. A similar result occurs when a digital document is annotated electronically, such that the resulting digital document includes both the original content and the annotations.

To this end, and in accordance with an embodiment of the present invention, techniques are disclosed for restoring a modified document to an original state. As used in this disclosure, the term "original state" refers to a document in a condition prior to alteration or modification. For example, a document in an original state may include a book, pamphlet, brochure, magazine, newspaper or other printed material as it was originally published with no other markings or notations. As used in this disclosure, the term "modified" refers to a document that is not in its original state. For example, a modified document may include any printed material containing handwritten notations or other markings that were applied to the document after it was created and printed. Likewise, a modified document may include any digital document containing electronically provisioned notations or other markings that were applied to the document after it was created and initially stored.

In one particular embodiment of the present invention, the modified document is scanned into a digital form using an optical scanning device. In still another embodiment, the modified document is an electronically annotated digital document. In any such cases, the content of the modified digital document, including one or more annotations, is then grouped into several components, including text, images, form fields and text boxes, and marked shapes, based on corresponding component specifications. Each component is then categorized as being structured or unstructured. Structured components that correspond with representative entries in a component repository, such as text in a standard font size, weight and style, are identified as core document content. Unstructured components are identified as annotated document content or highlighted document content, depending on certain characteristics of the components (e.g., font, foreground color, background color). The categorized and identified components can then be presented separately or in various combinations. For instance, the core document content can be stored, displayed or printed without any of the modifications that were made to the consumed document, thereby replicating the appearance of the original document. Alternatively, the core document content can be selectively displayed, via a user interface, with some or all of the annotated document content or highlighted document content, which is separate from the core document content. Numerous configurations and variations will be apparent in light of this disclosure.

As used in this disclosure, the terms "scanned document" and "digital document" refer to a document that is digitally scanned or otherwise converted into digital form by an optical scanner or other suitable document reading device that captures images of the document. A digital document may be, for example, a scanned image or an otherwise electronically created document. The digital document may be searchable (or not), tagged (or not), or otherwise have any suitable structure and format. A hard copy document is a document having original content provided in some physical medium, such as paper, velum, cardboard, white board, black board, or some other suitable physical embodiment that can be digitally captured. A digital version of a hard copy can be made, for instance, by scanning the hard copy document, or frame grab technology to capture the hard copy (e.g., electronic whiteboards that allow the contents of the physical whiteboard to be captured electronically), and photographing the hard copy, to name a few examples. Further note that original content can be projected onto a physical surface (such as a white board) so that it can then be annotated, and then a hard copy of the annotated original content can then be made (e.g., frame grab, photograph, etc). Other processing may also be performed on the captured digital document, such as OCR to make the digital version searchable. Any number of such post-image capture processes can be used to create a digital version of a hard copy. Numerous techniques for making hard copies and digital copies (sometimes called soft copies) will be apparent in light of this disclosure.

As used in this disclosure, the term "parser component" refers to a component that determines whether the scanned document includes content, text, shapes, and so forth that matches standard content, text, shapes, etc. in a standard library.

As used in this disclosure, the term "standard library" refers to a library of standardized objects, such as fonts, shapes, and so forth. For example, products such as Microsoft Word® include a library of fonts, which may be updated from time to time. These fonts can be stored in the standard library. In some embodiments, the standard library can be updated (e.g., via the Internet) from various sources, such as when new fonts are released by a font provider or installed on a computer by a user. Such updates can be performed automatically (e.g., at prescribed time intervals) or manually (e.g., when a library administrator performs an update).

As used in this disclosure, the term "structured library" refers to a repository that is generated or populated with categorized, structured objects (e.g., text, fonts, shapes, etc.) by the parser component when such structured objects are matched with standardized objects in the standard library.

As used in this disclosure, the term "unstructured library" refers to a repository that is generated or populated with categorized, unstructured objects (e.g., text, fonts, shapes, etc.) by the parser component when such unstructured objects cannot be matched with standardized objects in the standard library.

Example Use Case

FIG. 1A shows an example representation of an original document 100, in accordance with an embodiment. The original document 100 is generally printed on paper or another physical medium and may include, for example, a book, pamphlet, brochure, magazine, newspaper, thesis paper, journal article, or other printed material as it was originally published with no other markings or notations. Other examples of the original document 100 include printed copies of electronic documents, such as electronic books, Portable Document Format (PDF) documents, word processing documents, web pages, etc. The original document 100 can include any type of content, including, for example, text 102 and graphics 104, such as shown in the example of FIG. 1A. This content is considered original to the document 100 as published. For clarity, FIG. 1A shows one page of the original document 100; however, it will be understood that the original document 100 can include any number of pages and any kind of original content printed in any color or combination of colors.

FIG. 1B shows an example representation of a consumed document 110, in accordance with an embodiment. The consumed document 110 is similar to the original document 100 in that some, if not all, of the original content, such as the published text 102 and graphics 104, remains visible on the page. Additionally, the consumed document 110 includes annotations, notes, highlights and other markings on the pages of the document. Such markings may include, for example, handwritten notes 106, underlining 107, highlighting 108, or other comments and figures made with a pencil, pen, marker or other writing instrument. As will further be appreciated, such handwritten notes 106, underlining 107, highlighting 108, and other markings may also be provided in the digital domain (electronically) by way of a digital editing or note taking application using, for instance, a touch sensitive display screen and a user's finger or stylus. Numerous mechanisms for creating an annotated digital document will be apparent in light of this disclosure. In any such cases, the techniques provided herein can be used to restore that digital document to an original state.

The consumed document 110 can be scanned using an optical image scanner, which generates a digital image or other digital version of the consumed document 110. The content of the digital version of the consumed document 110 is grouped into several components, which are identified based on specifications corresponding to each type of component. The types of components may include, for example, text, images, form fields and text boxes, and marked shapes. Specifications for these component types can be stored in an electronic component repository, database or other form of data storage. The component repository can include representative fonts (e.g., Times New Roman) and font sizes, weights and styles that are commonly used in document publishing. The component repository can further include predefined shapes and symbols.

In the example of FIG. 1B, the consumed document 110 includes text components, generally indicated at 102, and image components, generally indicated at 104. Text components are categorized as being structured text or unstructured text. Structured text components include elements of the consumed document 110 that correspond to representative entries in the component repository, such as text (including font and size), images, text-fillable form fields and text boxes, and marked shapes (e.g., marked shapes in a PDF file). Unstructured text components include, for example, text with no defined or matching font (e.g., handwriting) or font size. Structured text components that match entries in the component repository are identified as core document content. Examples of core document content include text having the same font type and font size as fonts in the component repository, and text having the same font as in the component repository but of variable font size. For instance, structured components of the digital document may include the unmodified body of the text printed in New Times Roman font. Forms and text boxes are grouped as other entities. Other structured components that include text adjacent to core document content, but having a different font or contrasting background/foreground color(s), are identified as core document content with highlighted entries. Unstructured components are identified as commented document content. Examples of commented document content include text that does not have the same font as fonts in the component repository (e.g., handwriting with no defined font size, weight or style) and shapes that do not match shapes defined in the component repository.

The categorized and identified components can then be stored and presented separately or in various combinations. For example, the core document content may be stored and displayed separately from the highlighted document content and the annotated document content such that the original document can be viewed or printed without any of the modifications that were made to the consumed document, thereby replicating the appearance of the original document. Alternatively, the core document content can be selectively overlaid, via a user interface control, with at least some of the annotated document content or highlighted document content.

Figure 2:
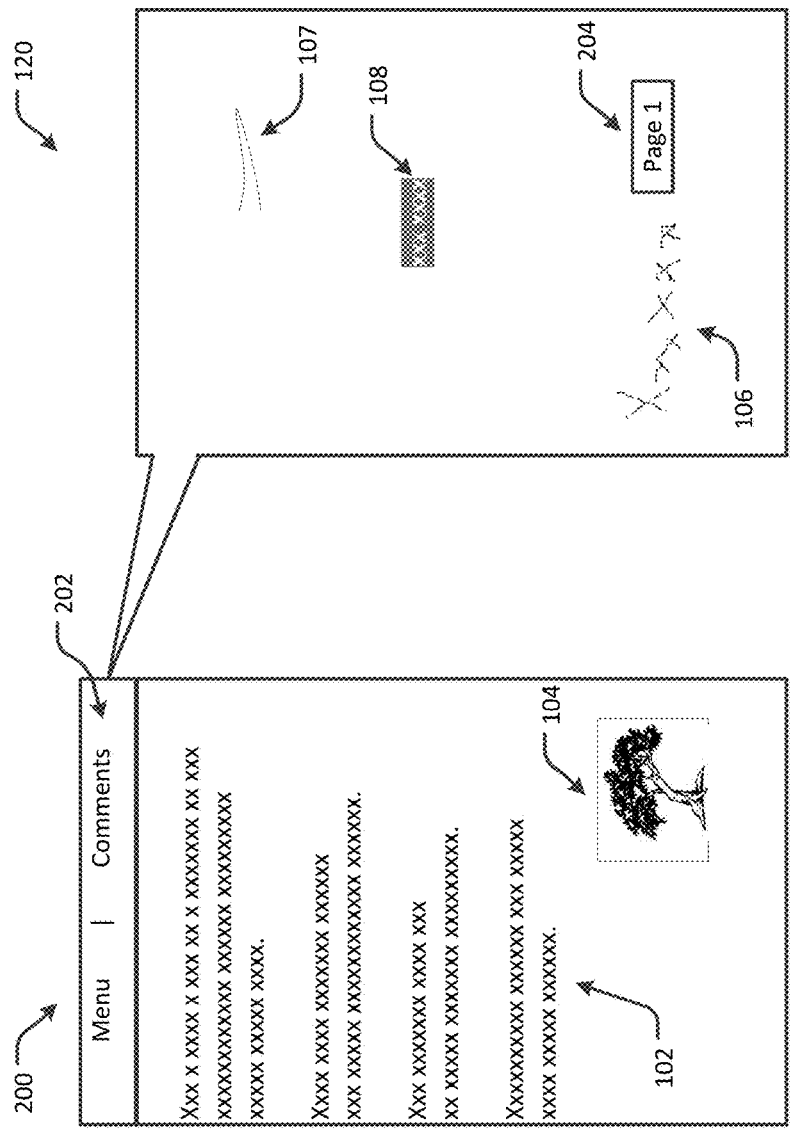
FIGS. 2A and 2B show an example graphical user interface for presenting categorized and identified components of the consumed document of FIG. 1B, in accordance with an embodiment of the present invention.

FIGS. 2A and 2B show an example graphical user interface 200 for presenting the categorized and identified components of the consumed document 110, in accordance with an embodiment. The interface 200 is configured to display the core document content of the original document 100, such as the text 102 and graphics 104 depicted in the example of FIG. 2A, without displaying any of the annotated or highlighted document content. The interface 200 is further configured to provide an interactive control element, indicated at 202, for user access to the added content 120 in the consumed document 110 that is not part of the original document 100 (e.g., the handwritten notes 106, underlining 107, and highlighting 108). When the user selects the "Comments" interactive control element 202, some or all of the additional components, such as the handwritten notes 106, underlining 107, and highlighting 108, are displayed along with the core document content. For example, the core document content may be overlaid with the annotated or highlighted content to replicate the appearance of the consumed document 110, or the annotated/highlighted content can be displayed separately from the core document content, such as shown in FIG. 2B. The interface 200 can be further configured to display or print groupings of the additional components separately or in different combinations. For example, the grouping may include all handwritten notes 106 in one group, all underlining 107 in another group, and all highlighting 108 in yet another group. In some cases, the page or line numbers where these additional components are located in the consumed document 110 can be displayed along with the additional components, such as generally indicated at 204 in FIG. 2B.

Example Applications

Embodiments of the present invention can be provided as a plugin, mobile application, desktop application, online service (e.g., cloud-based), subscription-based service, and a headless module within printer or fax machine (select fax original content option). In one example application, techniques described herein for restoring a modified document to an original state can be implemented in a photocopy workflow (e.g., via a custom setting in photocopy or fax machine). For instance, modified pages are photocopied and the photocopier outputs a copy of original pages when the custom setting is selected. Similarly, in a fax workflow, modified pages are scanned and copies of the original pages without any handwritten notes and other non-original content are faxed to the designated recipient when the custom setting is selected. Generally, the techniques described herein can be used for digitization of modified documents or printing/photocopying/faxing original versions of modified documents. Other applications will be apparent in light of this disclosure.

Example Methodologies

Figure 3:
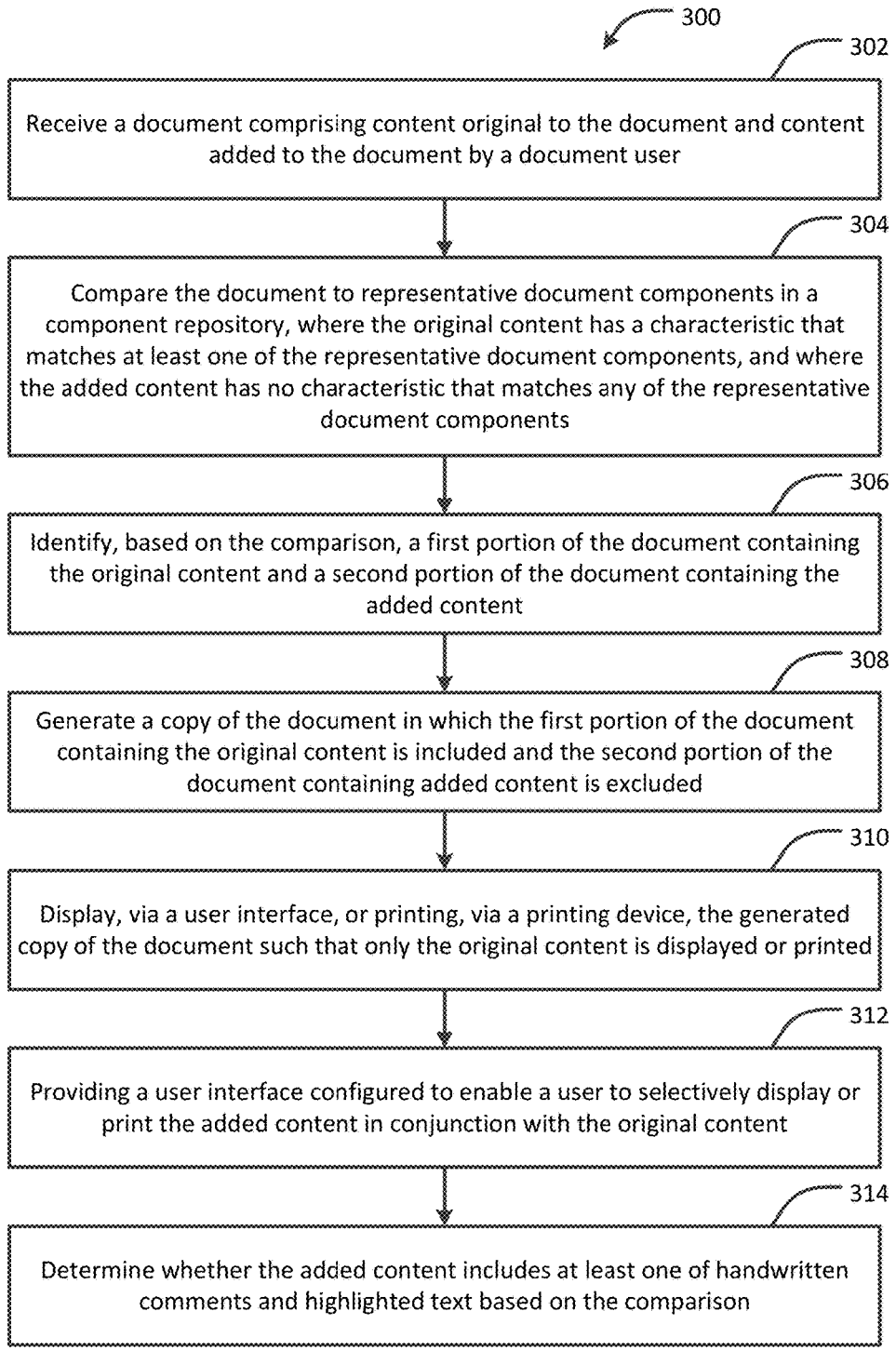
FIG. 3 shows a flow diagram of an example methodology for restoring a modified document to an original state, in accordance with an embodiment of the present invention.

FIG. 3 shows a flow diagram of an example methodology 300 for restoring a modified document to an original state, in accordance with an embodiment. The method 300 begins by receiving 302 an optically scanned, imaged or digitized version of a document, such as a digital version of the consumed document 110 of FIG. 1B, or a document in digital form. The scanned document includes printed content that is original to the document (e.g., content as originally published, such as text and graphics) and content added to the document by a document user (e.g., handwritten notes, figures, highlighting, strike-through markings, etc.). The method 300 continues by comparing 304 the scanned document to representative document components in a component repository, such as described in further detail with respect to FIGS. 4A and 4B. The original content has a characteristic that matches at least one of the representative document components, while the added content has no characteristic that matches any of the representative document components. The characteristic may include, for example, text having the same font type and font size as fonts in the component repository, text having the same font as in the component repository but of variable font size, or a non-text (e.g., graphical) element that matches a shape defined in the component repository. The method 300 continues by identifying 306, based on the comparison, a first portion of the scanned document containing the original content and a second portion of the scanned document containing the added content, and generating 308 a copy of the scanned document in which the first portion of the scanned document containing the original content is included and the second portion of the scanned document containing added content is excluded (e.g., the generated copy is the consumed document restored to its original condition). In some embodiments, the generated copy of the document is in Portable Document Format (PDF) or another suitable document format. In some such embodiments, the second portion of the digital document containing the added content can be stored in a layer of the PDF separate from the first portion of the digital document containing the original content. In another embodiment, a copy of the scanned document can be generated in which the second portion of the scanned document containing the added content is included and the first portion of the scanned document containing the original content is excluded. In yet another embodiment, a copy of the scanned document can be generated in which some or all of the first and second portions of the scanned document are included, while other such portions (or no such portions) are excluded.

In some embodiments, the method 300 includes displaying 310, via a user interface, or printing, via a printing device, the generated copy of the document such that only the original content is displayed or printed (e.g., the generated copy appears as the original document 100 of FIG. 1A without any annotations, highlights or other markings added by the document user). In some embodiments, the method 300 further includes providing 312 a user interface configured to enable a user to selectively display or print the added content in conjunction with the original content (e.g., the user interface 202 for displaying the added content 120 shown in FIGS. 2A and 2B). In some embodiments, the method 300 includes determining 314 whether the added content includes handwritten comments, highlighted text, or both, based on the comparison. For example, all of the handwritten comments can be grouped together, and all of the highlighted text can be grouped together separately from the handwritten comments. In this manner, the user can, via the user interface, selectively display or print the handwritten comments, the highlighted text, both or neither. The added content can be grouped in other ways, such as grouping by color of the highlighted text, grouping by shapes, grouping by text boxes and form fields, etc.

Figure 4A:
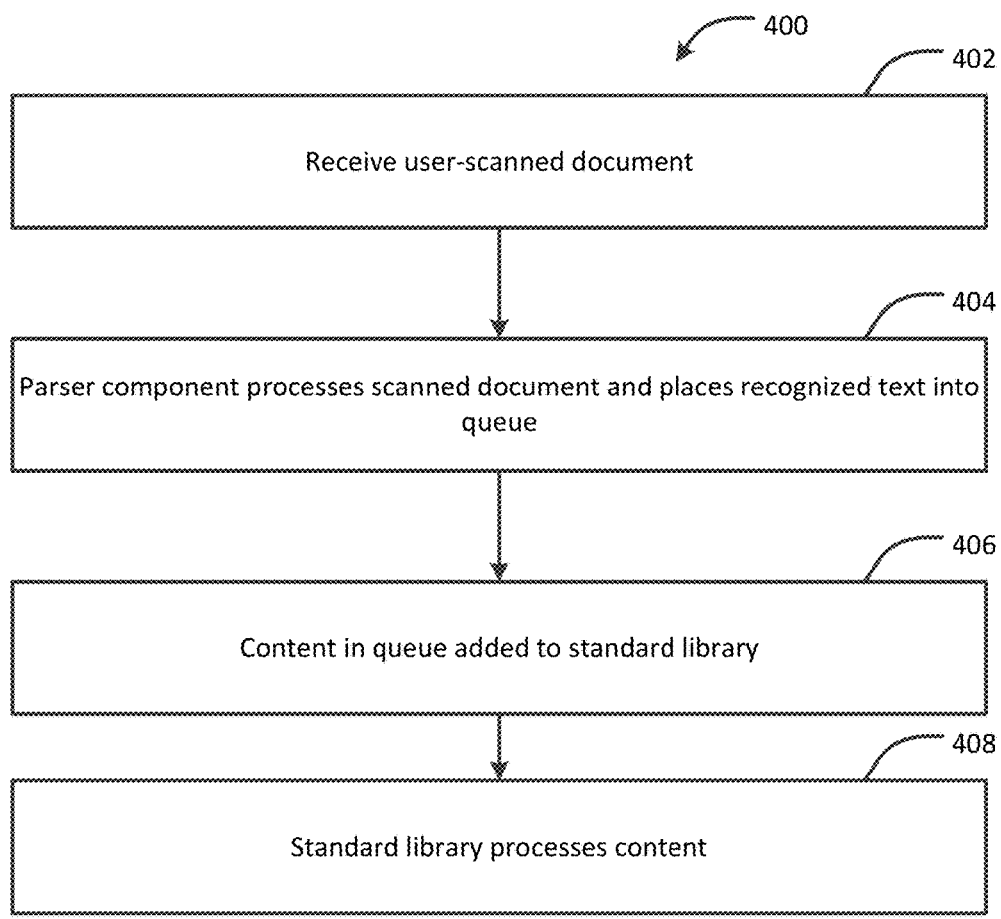
FIGS. 4A and 4B are flow diagrams of another example methodology for restoring a modified document to an original state, in accordance with an embodiment of the present invention.
Figure 4B:
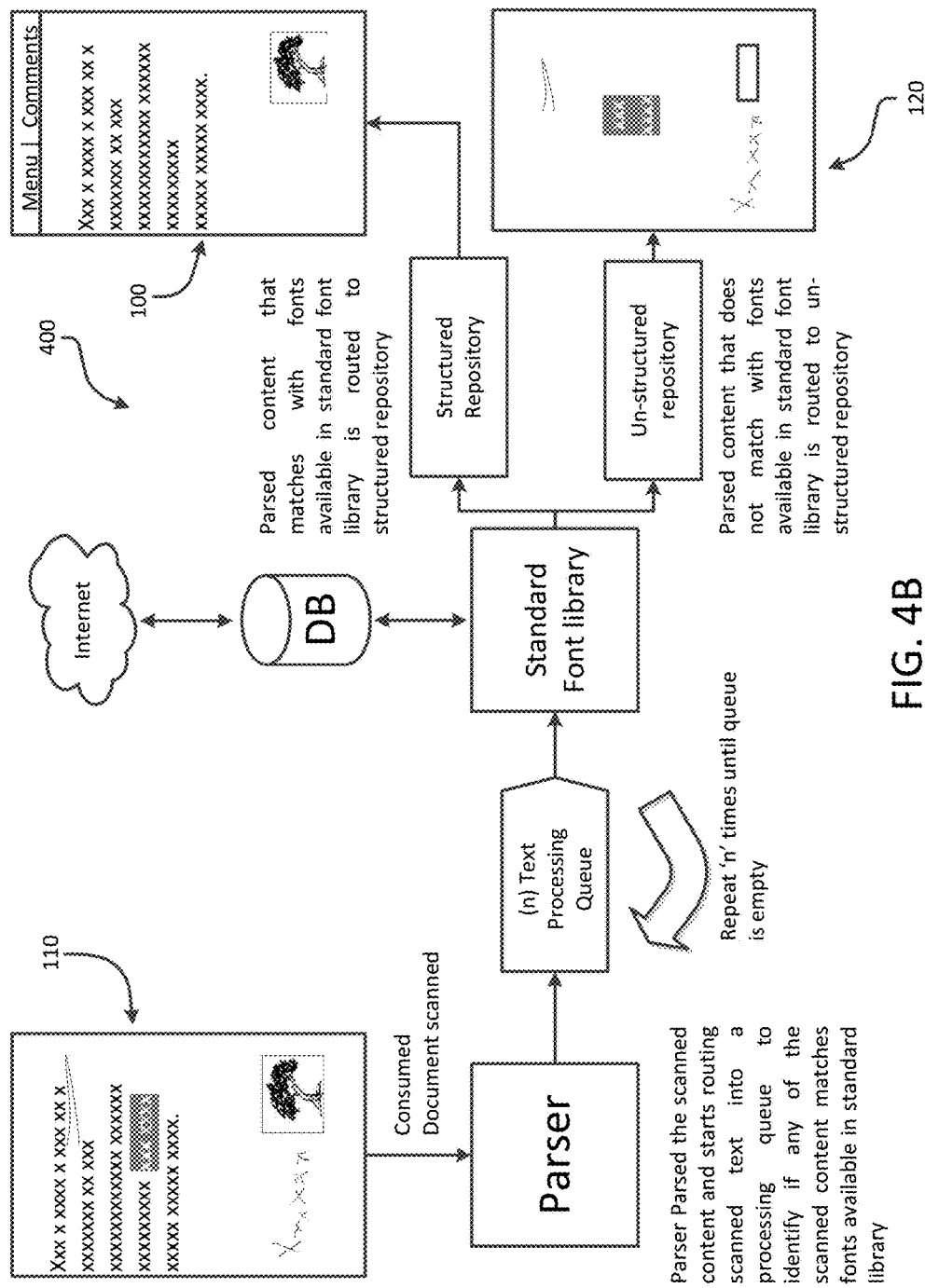

FIGS. 4A and 4B are flow diagrams of another example methodology 400 for restoring a modified document to an original state, in accordance with an embodiment. Initially, the method 400 includes receiving 402 a document scanned by a user. The document can be a consumed document (e.g., a document with added content) having structured and unstructured text, fonts, shapes or other content. Structured content may include, for example, content created using a word processor or other computer application. Such structured content can include standard fonts, font sizes, shapes or other standardized objects. Unstructured content may include, for example, hand written comments on an original, printed document.

The scanned document is then processed 404 by a parser component. The parser component parses the content of the scanned document, such as text (e.g., letters, words, sentences, etc.) or other objects, and places the parsed content into a processing queue. The contents of the processing queue are added 406 to a standard library. The standard library then processes 408 the parsed content. For example, the standard library may automatically update a font library to make sure the font library includes any new fonts. The standard library may pick one portion of the parsed content (e.g., a portion of text, such as individual letters, words, or sentences, or other distinguishing features) at a time from the processing queue and attempt to match a characteristic of that portion (e.g., text in a certain font, shapes, spaces between words, sentences and alignment of words or sentences with each other, etc.) with one or more representative fonts in the font library or other representative objects. Extensions to the library can include mathematical equations made up of fonts and symbols. In some cases, the content written on the paper (that is, added content) can be defined as structured (e.g., computerized/software application created) or unstructured (e.g., manual) content. If a matching font or object is located, the corresponding portion of the parsed content is flagged as structured text or a structured object. Such structured text or objects may be routed to a structured repository, which includes some or all of the original content of the scanned document. If there is no characteristic in the portion of the parsed content that matches a font or object in the standard library, the corresponding portion of the parsed content is flagged as unstructured text or an unstructured object. Such unstructured text/objects may be routed to an unstructured repository, which includes some or all of the content in the scanned document that is not original (e.g., it is added or modified content). In some cases where the parsed content includes strike-through lines, highlighting, or other markings superimposed on otherwise original text, the underlying text may be identified and processed as described above, while the superimposed markings may be categorized as unstructured content. This process can be repeated multiple times, for example, for each portion of the parsed content until all portions of the parsed content are processed. Objects in the structured repository can be used to generate a copy of the scanned document that contains the original content and excludes the added content. Objects in the unstructured repository can be used to generate a copy of the scanned document that contains the added content and excludes the original content. Objects in both the structured and unstructured repositories can be used to generate a copy of the scanned document that contains any or all of the original content and the added content. Such copies can be displayed or printed by a user via a user interface (e.g., the user interface 200 of FIG. 2A).

Any number of known pattern matching or recognition techniques can be used to match fonts, shapes, or other objects (such as those used in optical character recognition (OCR) to identify original content of the digital document. For example, in some embodiments, matrix matching or image correlation can be used wherein a given object (e.g., font or shape) or features thereof can be detected and extracted from a digital document and compared to a database of predefined or otherwise known objects such glyphs and shapes, and features thereof. This comparison can be done, for example, on a pixel-by-pixel basis. The comparison process is typically vector-based, where both extracted features and database features are represented as vectors. In some cases, nearest neighbor classifiers such as the so-called k-nearest neighbors algorithm can be used to compare extracted features with stored features to identify the nearest match. In some specific embodiments, publicly available character recognition software applications such as Tesseract and Cuneiform can be used to identify fonts and objects in the digital document. Any number of other known object recognition techniques can be used, as will be appreciated in light of this disclosure.

Example Computing Device

Figure 5:
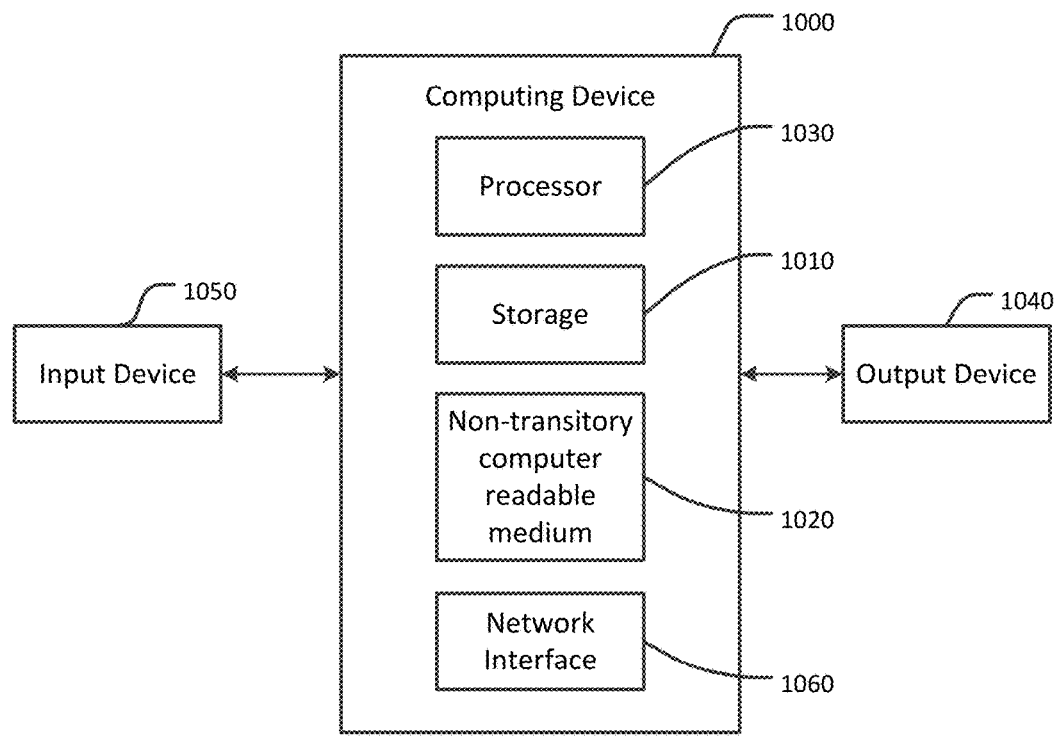
FIG. 5 is a block diagram representing an example computing system that may be used in accordance with an embodiment of the present invention.

FIG. 5 is a block diagram representing an example computing device 1000 that may be used to perform any of the techniques as variously described in this disclosure. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a 3D printer. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a document comprising content original to the document and content added to the document by a document user; comparing the document to representative document components in a component repository, wherein the original content has a characteristic that matches at least one of the representative document components, and wherein the added content has no characteristic that matches any of the representative document components; identifying, based on the comparison, a first portion of the document containing the original content and a second portion of the document containing the added content; and generating a copy of the document in which the first portion of the document containing the original content is included and the second portion of the document containing added content is excluded. In some cases, the document is a digital document (e.g., a scanned, imaged or digitized version of a paper document). In some cases, the characteristic includes at least one of a text element matching a font defined in the component repository and a non-text element matching a shape defined in the component repository. In some cases, the process includes displaying, via a user interface, or printing, via a printing device, the generated copy of the document such that only the original content is displayed or printed. In some cases, the process includes providing a user interface configured to enable a user to selectively display or print the added content in conjunction with the original content. In some cases, the process includes determining whether the added content includes at least one of handwritten comments and highlighted text based on the comparison. In some cases, the generated copy of the document is in Portable Document Format (PDF). In some such cases, the received document is a digital document created from a hard copy document having annotations manually provided thereon. In some such cases, the process includes storing the second portion of the document containing the added content in a layer of the PDF separate from the first portion of the document containing the original content. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented data processing method comprising:
receiving, by a processor, an electronic document comprising content original to the electronic document and content added to the electronic document by a document user, the electronic document including at least one of a hard copy document optically scanned via an optical scanning device and a digital document electronically annotated via a computing device;

automatically comparing, by the processor, a plurality of characteristics of the electronic document to representative document components in a component repository, each characteristic including one of a text component and a graphical component;

determining, by the processor, whether the added content includes at least one of handwritten comments and highlighted text based on the comparison;

automatically categorizing, by the processor, each characteristic of the electronic document as one of a structured component representing the original content and an unstructured component representing the added content, the original content having at least one characteristic that matches at least one of the representative document components, the added content having no characteristic that matches any of the representative document components;

identifying, by the processor based on the categorization, a first portion of the electronic document containing the structured component representing the original content and a second portion of the electronic document containing the unstructured component representing the added content; and generating, by the processor, an electronic copy of the electronic document, wherein the electronic copy includes the first portion of the electronic document containing the structured component representing the original content, and wherein the electronic copy excludes the second portion of the electronic document containing the unstructured component representing the added content.

2. The method of claim 1, wherein the characteristic includes at least one of a text element matching a font defined in the component repository and a non-text element matching a shape defined in the component repository.

3. The method of claim 1, further comprising displaying, via a user interface, or printing, via a printing device, the generated electronic copy of the electronic document such that only the original content is displayed or printed.

4. The method of claim 1, further comprising providing a user interface configured to enable a user to selectively display or print the added content in conjunction with the original content.

5. The method of claim 1, wherein the received electronic document is a digital document created from the hard copy document having annotations manually provided thereon, and wherein the generated copy of the document is in Portable Document Format (PDF).

6. The method of claim 5, further comprising storing the second portion of the electronic document containing the added content in a layer of the PDF separate from the first portion of the electronic document containing the original content.

7. A system comprising:

a storage; and one or more processors operatively coupled to the storage, the one or more processors configured to execute instructions stored in the storage that when executed cause the one or more processors to:

receive an electronic document comprising content original to the electronic document and content added to the electronic document by a document user, the electronic document including at least one of a hard copy document optically scanned via an optical scanning device and a digital document electronically annotated via a computing device;

automatically compare a plurality of characteristics of the electronic document to representative document components in a component repository, each characteristic including one of a text component and a graphical component;

determine whether the added content includes at least one of handwritten comments and highlighted text based on the comparison;

automatically categorize each characteristic of the electronic document as one of a structured component representing the original content and an unstructured component representing the added content, the original content having at least one characteristic that matches at least one of the representative document components, the added content having no characteristic that matches any of the representative document components;

identify, based on the categorization, a first portion of the electronic document containing the structured component representing the original content and a second portion of the electronic document containing the unstructured component representing the added content; and generate an electronic copy of the electronic document, wherein the electronic copy includes the first portion of the electronic document containing the structured component representing the original content, and wherein the electronic copy excludes the second portion of the electronic document containing the unstructured component representing the added content.

8. The system of claim 7, wherein the characteristic includes at least one of a text element matching a font defined in the component repository and a non-text element matching a shape defined in the component repository.

9. The system of claim 7, wherein the instructions further cause the one or more processors to display, via a user interface, or printing, via a printing device, the generated electronic copy of the electronic document such that only the original content is displayed or printed.

10. The system of claim 7, wherein the instructions further cause the one or more processors to provide a user interface configured to enable a user to selectively display or print the added content in conjunction with the original content.

11. The system of claim 7, wherein the generated electronic copy of the electronic document is in Portable Document Format (PDF).

12. The system of claim 11, wherein the instructions further cause the one or more processors to store the second portion of the electronic document containing the added content in a layer of the PDF separate from the first portion of the electronic document containing the original content.

13. A non-transitory computer program product having instructions encoded thereon that when executed by one or more processors cause a process to be carried out, the process comprising:

receiving an electronic document comprising content original to the electronic document and content added to the electronic document by a document user, the electronic document including at least one of a hard copy document optically scanned via an optical scanning device and a digital document electronically annotated via a computing device;

automatically comparing a plurality of characteristics of the electronic document to representative document components in a component repository, each characteristic including one of a text component and a graphical component;
determining whether the added content includes at least one of handwritten comments and highlighted text based on the comparison;
automatically categorizing each characteristic of the electronic document as one of a structured component representing the original content and an unstructured component representing the added content, the original content having at least one characteristic that matches at least one of the representative document components, the added content having no characteristic that matches any of the representative document components;
identifying, based on the categorization, a first portion of the electronic document containing the structured component representing the original content and a second portion of the electronic document containing the unstructured component representing the added content; and
generating an electronic copy of the electronic document, wherein the electronic copy includes the first portion of the electronic document containing the structured component representing the original content, and wherein the electronic copy excludes the second portion of the electronic document containing the unstructured component representing the added content.

14. The non-transitory computer program product of claim 13, wherein the characteristic includes at least one of a text element matching a font defined in the component repository and a non-text element matching a shape defined in the component repository.

15. The non-transitory computer program product of claim 13, wherein the process includes displaying, via a user interface, or printing, via a printing device, the generated electronic copy of the electronic document such that only the original content is displayed or printed.

16. The non-transitory computer program product of claim 13, wherein the process includes providing a user interface configured to enable a user to selectively display or print the added content in conjunction with the original content.

17. The non-transitory computer program product of claim 13, wherein the generated electronic copy of the electronic document is in Portable Document Format (PDF), and wherein the process includes storing the second portion of the electronic document containing the added content in a layer of the PDF separate from the first portion of the electronic document containing the original content.

* * * * *